(12) United States Patent
Echizen et al.

(10) Patent No.: US 7,113,613 B2
(45) Date of Patent: Sep. 26, 2006

(54) WATERMARK INFORMATION DETECTION METHOD

(75) Inventors: Isao Echizen, Yokohama (JP); Hiroshi Yoshiura, Tokyo (JP); Hiroyuki Kimura, Hiratsuka (JP); Akio Fukushima, Yokohama (JP); Kousuke Anzai, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 605 days.

(21) Appl. No.: 10/078,573

(22) Filed: Feb. 20, 2002

(65) Prior Publication Data

US 2002/0186861 A1    Dec. 12, 2002

(30) Foreign Application Priority Data

Jun. 8, 2001  (JP) .............................. 2001-173406
Aug. 3, 2001  (JP) .............................. 2001-235690

(51) Int. Cl.
*G06K 9/00* (2006.01)
(52) U.S. Cl. .................. 382/100; 382/226; 382/227; 713/176
(58) Field of Classification Search ................ 382/100, 382/226, 227; 713/200, 176
See application file for complete search history.

(56) References Cited

U.S. PATENT DOCUMENTS

| | | | |
|---|---|---|---|
| 5,636,292 A | 6/1997 | Rhoads ....................... | 382/232 |
| 5,721,788 A | 2/1998 | Powell et al. ............... | 382/100 |
| 5,930,369 A | 7/1999 | Cox et al. ..................... | 380/54 |
| 5,949,055 A | 9/1999 | Fleet et al. ................. | 235/469 |
| 6,037,984 A | 3/2000 | Isnardi et al. ............... | 348/403 |
| 6,055,564 A * | 4/2000 | Phaal .......................... | 709/207 |
| 6,072,888 A | 6/2000 | Powell et al. ............... | 382/100 |
| 6,104,826 A | 8/2000 | Nakagawa et al. ......... | 382/100 |
| 6,108,434 A | 8/2000 | Cox et al. ................... | 382/100 |
| 6,285,774 B1 | 9/2001 | Schumann et al. ......... | 382/100 |
| 6,341,350 B1 | 1/2002 | Miyahara et al. ........... | 713/176 |
| 6,400,826 B1 | 6/2002 | Chen et al. | |
| 6,418,232 B1 | 7/2002 | Nakano et al. ............. | 382/100 |
| 6,456,727 B1 | 9/2002 | Echizen | |
| 6,563,935 B1 | 5/2003 | Echizen | |
| 6,674,858 B1 * | 1/2004 | Kimura et al. .............. | 380/202 |
| 6,785,401 B1 * | 8/2004 | Walker et al. .............. | 382/100 |
| 6,802,011 B1 * | 10/2004 | Ogino ........................ | 713/200 |

FOREIGN PATENT DOCUMENTS

JP        7290767        11/1995

OTHER PUBLICATIONS

S. Kobayashi, et al "Data Hiding Based on Neighbor Statistics", Proceedings of the 56th Nation Convention of Information Processing Society of Japan, 3-37 to 3-38.

(Continued)

*Primary Examiner*—Jingge Wu
*Assistant Examiner*—Shefali Patel
(74) *Attorney, Agent, or Firm*—Mattingly, Stanger, Malur & Brundidge, P.C.

(57) ABSTRACT

A digital watermark information detection method for detecting information inserted as a digital watermark from contents has a step of converting the contents into a predetermined specified format and a step of trying to detect information from the converted contents. When a plurality of specified formats are defined in advance and detection of the information from the converted contents fails, the contents is converted into another specified format and the information detection is retried.

4 Claims, 11 Drawing Sheets

OTHER PUBLICATIONS

Mitchell, "Multimedia Data-Embedding and Watermarking Technologies", Proceeding of the IEEE vol. 86, No. 6, Jun. 1988.

Jana, Robust MPEG Video Watermarking Technologies:, ACM Multimedia '98, UK, ACM 1-58113-036-8/98/0008.

"General Quality Maintenance Module for Motion Picture Watermarking", IEEE Transactions on Consumer Electronics, vol. 45, No. 4, pp. 1150-1158, Nov. 1999.

"Techniques for data hiding", Proc. SPIE, vol. 2420, pp. 164-173, 1995.

"A Secure, Robust Watermark for Multimedia", LNCS1174, pp. 185-206, 1996.

U.S. Appl. No. 09/583,952, filed May 31, 2000.

U.S. Appl. No. 09/523,523, filed Mar. 10, 2000.

\* cited by examiner

611 TRANSFORMATION PATTERN SEQUENCE HOLDER

| PARAMETER | PRIORITY ORDER | TRANSFORMATION PATTERN | | READ FLAG | SUCCESS FREQUENCY |
|---|---|---|---|---|---|
| | | TRANSFORMATION | ROTATION | | |
| 0 | 1 | WITHOUT TRANSFORMATION | 0° | 1 | 2 |
| 1 | 2 | HD → SD | 0° | 1 | 1 |
| 2 | 3 | HD → SD | 90° | 0 | 0 |
| 3 | 4 | REVERSE | 0° | 0 | 0 |
| 4 | 5 | SD → HD | 0° | 0 | 0 |
| ... | ... | ... | ... | ... | ... |

WATERMARK INFORMATION DETECTION METHOD

CROSS-REFERENCE TO RELATED APPLICATION

This application relates to U.S. patent application Ser. No. 09/583,952 filed on May 31, 2000 (Applicant Reference No. 349900671US01) and Ser. No. 09/523,523 filed on Mar. 10, 2000, and assigned to the present assignee. The contents of that applications are incorporated herein by reference.

BACKGROUND OF THE INVENTION

The present invention relates to an digital watermark technique and a digital watermark detection method for digital data especially image data.

From the standpoint of protection of a copyright to works such as image data and music (hereinafter referred to as contents), the digital watermark technique has been noticed. The digital watermark technique is a technique of inserting predetermined information (watermark information) into digital data (hereinafter simply referred to as data) by directly changing a data value at a predetermined position through the use of a predetermined rule. Taking image data, for instance, information concerning a purchaser of the image data is inserted in invisible form into the image data at a predetermined position thereof in accordance with a predetermined rule and in the event that the image data is copied without authorization, the inserted predetermined information is detected from the data copied without authorization by using a pixel value at the predetermined position in accordance with the predetermined rule to specify a person who committed the unauthorized copying.

The digital watermark technique is described in "General Quality Maintenance Module for Motion Picture Watermarking" by I. Echizen, H. Yoshiura, T. Arai, H. Kimura and T. Takeuchi, IEEE Transactions on Consumer Electronics, Vol. 45, No. 4, pp. 1150–1158, November 1999.

The image data has possibly been applied with various image processes of geometrical conversion such as enlargement, reduction, compression and expansion and of trimming in the course of usage and circulation after creation of the image data.

When image format conversion or geometrical transformation such as enlargement/reduction and rotation is applied to the image data having watermark information inserted in this manner, that is, when transformation is applied to the digital data, the pixel value at a predetermined position that has been changed by the watermark insertion is also changed by the transformation. This leads to a failure to detect the watermark. As an example of technique to solve this problem, a technique described in U.S. Pat. No. 5,636,292 is available.

Further, as described in "Techniques for data hiding" by W. Bender, D. Gruhl and N. Morimoto, Proc. SPIE, Vol. 2420, pp. 164–173 (1995), a method for embedding information of one bit by operating several thousands of pixels is known. In this method ("digital watermark utilizing statistical properties"), an artificial pixel operation is detected statistically by utilizing properties of a natural image. Therefore, during detection of watermark information, there needs no original image data prevailing before embedding of a watermark. In this watermark method, even when transformation or trimming of data is carried out, the watermark information is relatively difficult to lose.

On the other hand, there are many image formats of input image data representing an object to be embedded with information. As factors for determination of an image format, the number of pixels of the image, a color expression method (GRB type, YUV type, YCrCb type, CMYK type or the like) and a color gradation number are available and as factors for determination of a format of a motion picture, the number of lines in the horizontal direction of an image, an interlace method or a progressive method is available.

There is a possibility that the image data embedded with digital watermark information is further applied with various image processes such as JPEG compression, MPEG compression and geometrical transformation. "A Secure, Robust Watermark for Multimedia" by I. Cox, J. Kilian, T. Leighton and T. Shamoon, Proceedings of Information Hiding (LNCS 1174), pp. 185–206 (1996) describes a method of embedding watermarks in MPEG compressed images.

Thus, there are many image formats that need to be presupposed in a detection process. Accordingly, if all image formats or transformation patterns are to be dealt with in the digital watermark information detection process, detection algorithm becomes sophisticated and the time required for detection increases. Further, it is necessary to deal with an image having the maximum number of pixels defined by the image format, so that the memory capacity increases to increase the hardware size of the detection processor.

Figure 4:
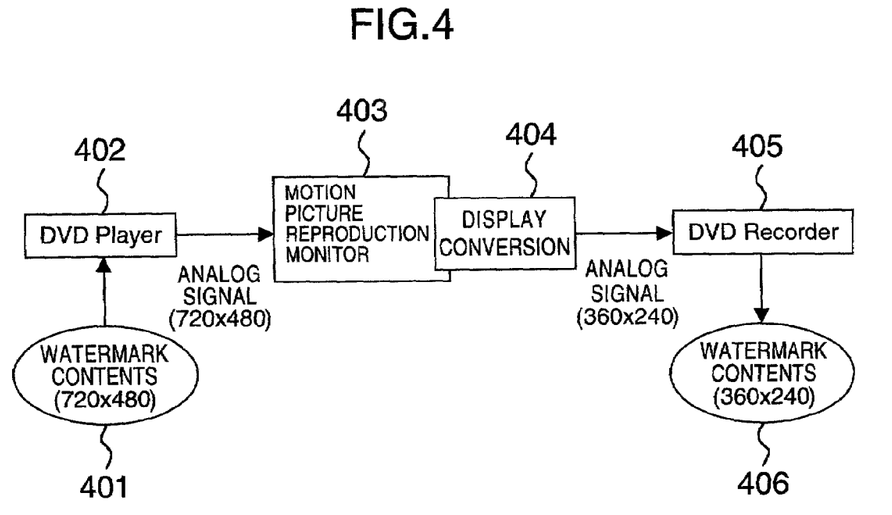
FIG. 4 is an apparatus configuration diagram showing an example of format conversion in motion picture data between devices.

Actual distribution of the image data will now be considered. FIG. 4 is an apparatus construction diagram showing an example of format conversion in motion picture data between units. A DVD-ROM 401 stores watermarked motion picture data. A watermark is embedded in a format of the motion picture data, in which format the size of each frame image is defined by 720 pixels in the vertical direction and 480 pixels in the horizontal direction ((720×480) pixels). A DVD player 402 for reproducing the DVD-ROM 401 displays a motion picture on a motion picture reproduction monitor 403 through an analog output. The motion picture reproduction monitor 403 has format display conversion function 404 by which several kinds of formats can be displayed. The display conversion 404 applies a format conversion to inputted motion picture data and thereafter displays the transformed motion picture data on the screen and delivers an analog output. For example, the display conversion 404 converts watermarked motion picture data having a format of 720×480 pixels into a format of 360×240 pixels and a DVD recorder 405 records the motion picture data on a DVD-RAM 406 through an analog output. The image stored in the DVD-RAM 406 is watermarked motion picture data in which the number of pixels in the vertical and horizontal directions is ½ reduced (at a reduction ratio of 1/4). In the apparatus construction as above, the transformation applied to the image data is defined by only several kinds of format conversions owned by the display conversion function 404 built in the motion picture reproduction monitor 403. Even in a general apparatus handling contents, the transformation applied the contents is limited to some extent.

SUMMARY OF THE INVENTION

The present invention provides apparatus and method for efficiently detecting watermark information from contents data supposed to be transformed.

Figure 11:
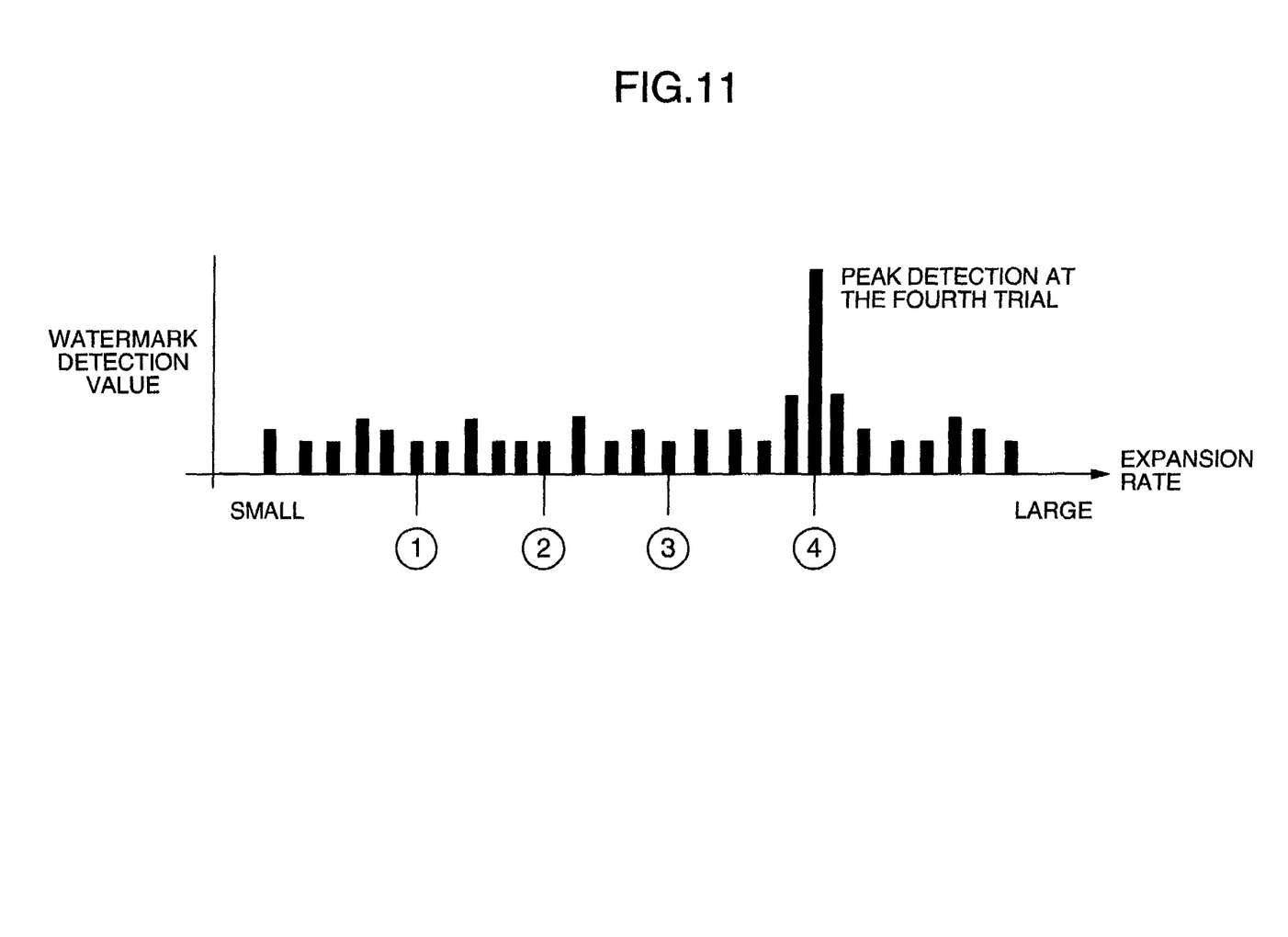
FIG. 11 is a diagram for explaining the feature of the present invention.

When detecting the watermark from the transformed contents, it should be found out what type of transformation and which transformation rate have been applied to the contents. Meanwhile the transformation applied the contents is actually limited as mentioned above. The present invention assumes that some specific translation types and some specific transformation rates are more likely and tries the watermark detection under the assumption. FIG. 11 shows the relation between the watermark detection values and the expansion rates. Many expansion rates are available. However, by trying the detection under the specific expansion rates (1), (2), (3) and (4), the watermark will be detected at the fourth trial, which is match faster than sequentially trying the watermark detection under various expansion rates, for example, from the smallest rate to the larger rate.

The present invention is a digital watermark information detection method for detecting information inserted as digital watermark from contents including a first step of converting the contents into a predetermined specified format and a second step of trying to detect information from the converted contents. When a plurality of specified formats are defined in advance and detection of the information from the contents fails, the contents may be converted into a specified format other than that used in the first step to retry detection of the information.

Also, the present invention is a digital watermark information detection method for detecting digital watermark information from contents data including a preliminary process for trying to detect information corresponding to at least one bit, and a main process for reading all watermark information when the information detection in the preliminary process is successful. In the preliminary process, the presence/absence of digital watermark information in the contents is decided on the basis of information concerning at least one kind of data transformation supposed to be applied to the contents data.

Other features and advantages of the invention will become apparent from the following description of the embodiments of the invention taken in conjunction with the accompanying drawings.

DETAILED DESCRIPTION OF THE EMBODIMENTS

1. First Embodiment

A first embodiment of the present invention will be described hereunder. In this embodiment, image data embedded with a watermark utilizing the aforementioned statistical properties is mainly handled and known algorithm for watermark detection and watermark reading is used.

(1) Circulation of Image Data

Figure 1:
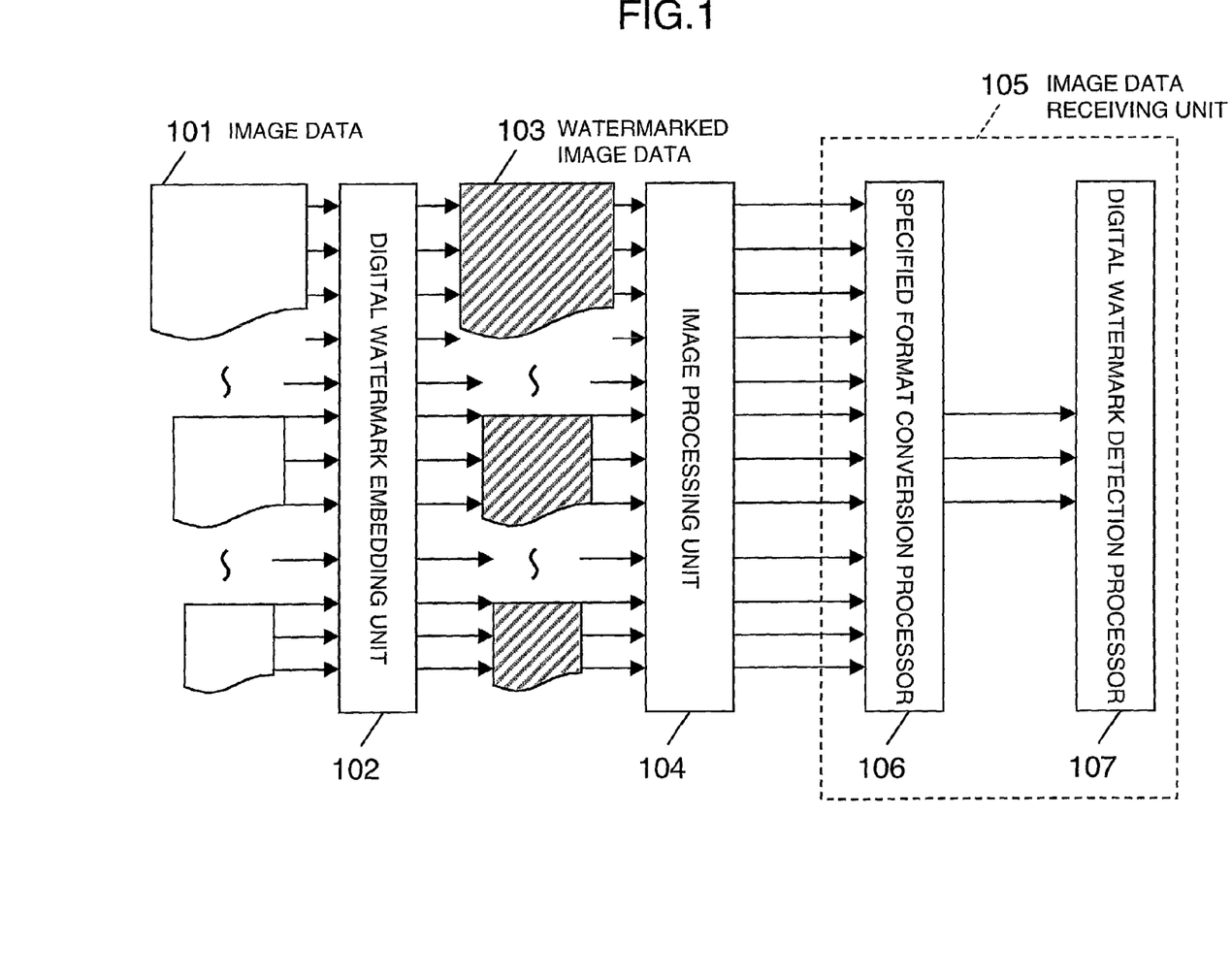
FIG. 1 is a diagram for explaining distribution of image data.

FIG. 1 is a diagram for explaining the circulation of image data. As shown in FIG. 1, watermark information is embedded in image data 101, in which many kinds of image formats exist, by means of a digital watermark embedding unit 102 to create watermarked image data 103. The thus created watermarked image data 103 is applied as necessary with image processing such as changing of the number of pixels by means of an image processing unit 104. The watermarked image data 103 or the watermark image data applied with the image processing is distributed through a recording medium or communication medium. An image data receiving unit 105 receives the watermarked image data 103 through the medium.

In the image data receiving unit 105, a specified format conversion processor 106 changes the inputted image data to a specified image format and the resulting image data is sent to a watermark detection processor 107. The watermark detection processor 107 receives the image data after conversion changed to the specified image format and tries a process for detection of the watermark information. When detection of the watermark information fails in respect of the converted image data, the specified format conversion processor 106 converts the input image data of the receiver into another format and the watermark detection processor 107 again carries out a process for detection of the watermark information.

(2) Construction of Image Data Receiving Unit

Figure 2:
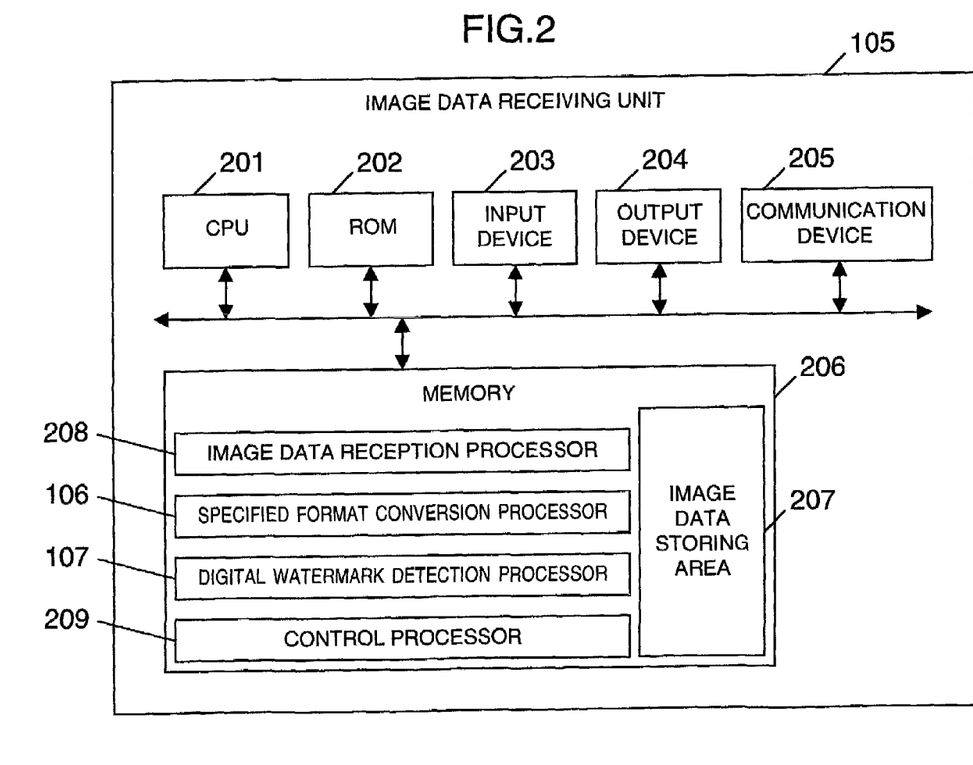
FIG. 2 is a diagram showing schematic construction of an image data receiving unit 105 in a first embodiment of the invention.

FIG. 2 is a schematic construction diagram of the image data receiving unit 105 shown in FIG. 1. As shown in FIG. 2, the image data receiving unit 105 in the present embodiment may be a general computer and includes a CPU 201, a ROM 202, an input device 203, an output device 204, a communication device 205 and a memory 206.

The CPU 201 is a unit for controlling operation of the whole of the image data receiving unit 105. In controlling operation of the whole of the image data receiving unit 105, the memory 206 serves as a storage unit for storing various process programs necessary for the control operation and data such as image data.

The input device 203 is a device for inputting image data on a recording medium such as DVD or CD-ROM and on a wired or wireless communication medium. The output device 204 is adapted to deliver a video output of received image data. In case voice data is added to the image data, the device 204 also delivers a voice output. The communication device 205 is adapted to communicate with another processing unit and control the same through the medium of a network such as Internet or intranet or a dedicated signal line such as SCSI or RS422.

The image data receiving unit 105 includes, as a circuit packaged on an LSI chip, an image data reception processor 208, the specified format conversion processor 106 and the digital watermark detection processor 107 and has a control processor 209 as a program developed on the memory 206. The image data receiving unit 105 also has, in the memory 206, an image data storing area 207 for storing received image data and image data converted into a specified format. Alternatively, like the control processor 209, each of the processors 106, 107 and 208 can be implemented with programs developed on the memory 206.

The CPU 201 executes each program. In an alternative, part or the whole of each program may be introduced to the image data receiving unit 105 from a portable memory medium or from another server via a communication medium.

The image data reception processor 208 stores, in a processable state, the whole or part of image data received by the input device 203 on the image data storing area 207.

In respect of image data developed on the memory 206, the specified format conversion processor 106 applies a process for deciding a format of the data from a data header and converting the developed image data into image data of a specified format. For example, when the format accords with standards termed 1080i in motion picture data for HD (High Definition), the number of pixels of a frame image is 1080 pixels (lines) in the vertical direction and 1920 pixels in the horizontal direction but for the same HD motion picture data, a plurality of other standards are available. The specified format conversion processor 106 converts the HD motion picture data, for which plural standards are available as mentioned above, into data of specified standards (for example, NTSC standards: 486 lines in the vertical direction and 720 pixels in the horizontal direction). The specified format conversion process includes other processes of trimming, rotation and a combination of them. The specified format conversion processor 106 has the function of conducting processes for conversion to the plural formats. Through this conversion process, the kind of image data subject to watermark detection is limited, thus reducing the memory size.

The digital watermark detection processor 107 applies a watermark information detection process to the image data converted into a specified format so as to detect watermark information. In accordance with the contents or substance of the watermark information detected by the digital watermark detection processor 107, the control processor 209 carries out a process for commanding control of the components in the receiving unit, commanding the output device 203 to indicate the control substance or detected information or commanding an external apparatus to control its components via the communication device 205.

When the individual processors of the image data receiving unit 105 are developed as programs on the memory 206 as shown in FIG. 2, the programs may be stored in a tamper-proof area in order to prevent unauthorized program analysis applied externally.

(3) Detection of Digital Watermark

Figure 3:
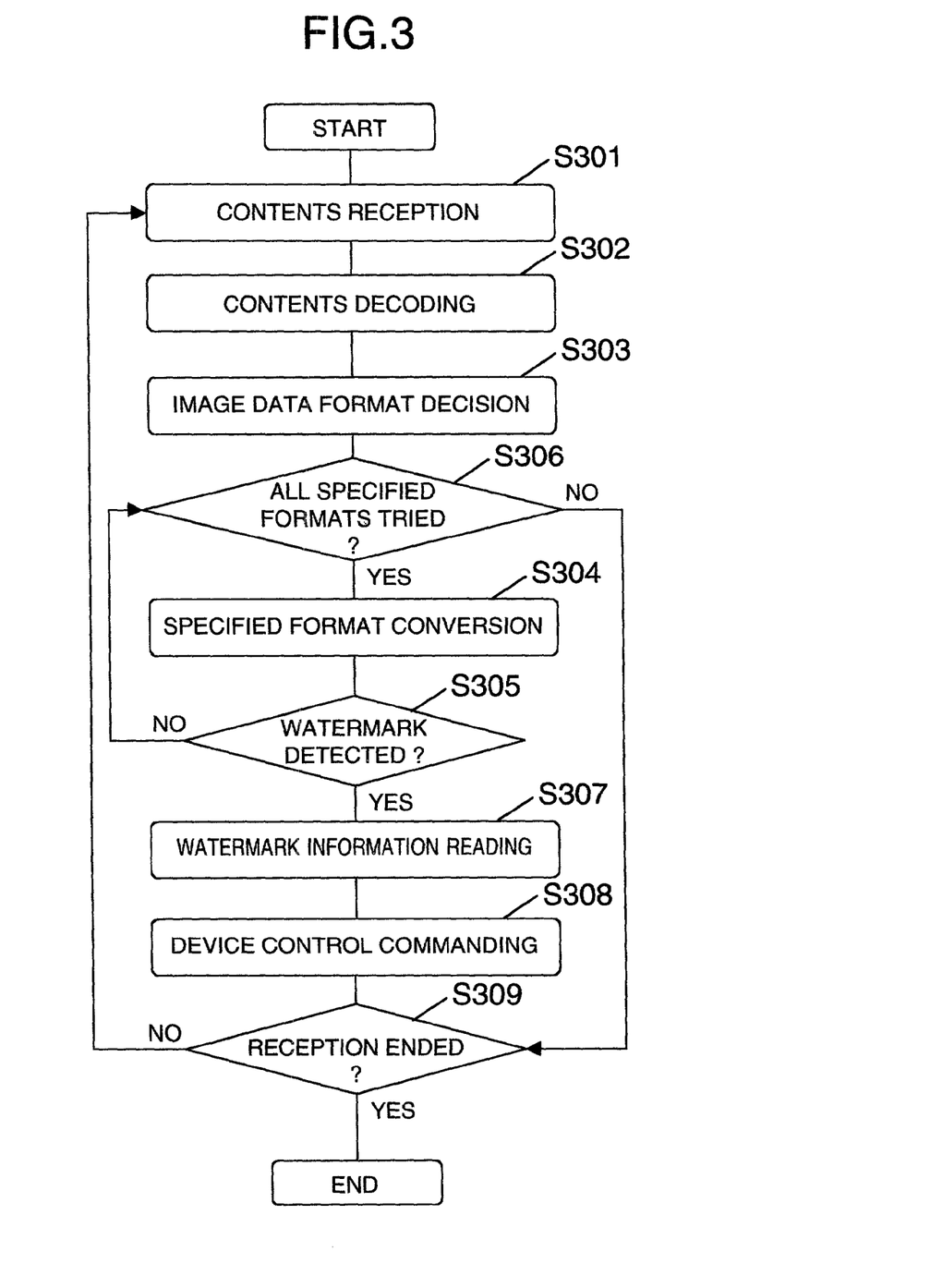
FIG. 3 is a flowchart showing procedures for watermark information detection process in the first embodiment.

FIG. 3 is a flowchart showing process procedures in the image data receiving unit 105 in the present embodiment.

In step S301, the image data reception processor 208 of image data receiving unit 105 receives the whole or part of image data through the input device 203 and stores the image data in the image data storing area 207 of the memory 206 inside the receiving unit.

In case the stored data is encrypted by scrambling, for instance, the image data reception processor 208 decodes the image data in step S302 by using a decoding key received when an authentication process is carried out between this unit and a transmission source of the image data of interest to de-scramble that image data.

In step S303, the specified format conversion processor 106 applies to the image data decoded in the step S302 a process for deciding an image format defined by the number of pixels, data format and so on, thus obtaining format information. When data for a decision process of image format or data concerning standards with which the image data accords is described at a predetermined location of image data such as header, a decision is made by consulting that data. In case the format of image data is given in advance as information concerning standards to the specified format conversion processor 106 or in case information concerning the format of image data is attached to the image data or saved referentially at another storage location, these format and information are consulted.

In step S304, the specified format conversion processor 106 uses the format information of image data obtained in the step S303 to apply a format conversion to the image data so that it may have a specified format and to store the image data after conversion in the image data storing area 207. The conversion to the specified format referred to herein indicates, as described previously, a conversion to standards concerning a specified image size or an image processing such as specified image size trimming. There are available processes for conversion to a plurality of specified formats but one of them is carried out in the step S304.

In step S305, the image data after conversion, converted into the specified format and stored in the image data storing area 207, is tried for watermark detection by means of the digital watermark detection processor 107. In this step, format information of the input image data and the specified format succeeding in the digital watermark detection may be recorded on the memory.

If this detection process fails to detect the watermark information, the program returns to step S306, in which the specified format conversion processor 106 decides whether all of the plurality of specified formats are tried for detection process.

If, in the step S306, the specified format conversion processor 106 determines that all the specified format conversions are tried for detection process, detection of the watermark information is determined to be impossible in respect of the image data of interest and watermark detection in that image data is stopped.

In case the presence of different image data to be received is determined in step S309, a reception process is carried out in the step S301.

If in the step S306 the specified format conversion processor 106 determines that all the specified format are not tried for detection process, the program returns to the step S304, in which the image data is applied with a process for conversion to another specified format that has not yet been tried for detection process. Then, in the step S305, the digital watermark detection processor 107 again applies a watermark information detection process to the image data of interest.

When watermark information is detected from the image data in the step S305, the digital watermark detection processor 107 reads the watermark information in step S307 so as to read information concerning control of components and an ID of a transmitter of the image data of interest from the detected information.

In step S308, the control processor 209 carries out in the light of the read information concerning component control a process for commanding control of components inside the receiving unit, commanding the output device 203 to indicate the control contents or the detected information or commanding an external apparatus to control its components via the communication device 205. Alternatively, the transmitter ID of the read-out image data may be delivered to an external display unit through the output device 204 or may be transmitted to an external apparatus through the communication device 205.

In the step S309, it is examined whether reception of all image data undergoing receiving operation at present is ended. If the reception of the image data is finished, the reception process is stopped but if the presence of image data that has not been received yet is determined, the program returns to the step S301 and the process for reception of image data continues.

In the specified format conversion process in the step S304, the sequence of the application of a plural specified format conversion processes is set up in advance on a memory table in respect of individual formats of input image data and a specified format conversion process is carried out in accordance with the sequence. In an alternative, the order of the application of specified format application processes may be changed in order that a conversion to a specified format having the high possibility of succeeding in watermark detection by gathering from past watermark detection achievements can preferentially be carried out and watermark detection can be tried.

2. Second Embodiment

A second embodiment will be described. In the present embodiment, too, image data embedded with information by the watermark method utilizing statistical properties will be handled. In the first place, the second embodiment differs from the first embodiment in that the watermark detection is divided into a preliminary process and a main process. In the preliminary process, detection of information corresponding to at least one bit is tried. Only when the information detection is successful in the preliminary process, that is, it is determined that a watermark is present, the program proceeds to the main process to read all of watermark information. In the second place, while in the first embodiment the image data is converted and then the watermark detection is tried, the watermark detection is tried by changing parameters of detection algorithm in the second embodiment. The detection algorithm utilizing statistical properties is known.

(1) Digital Watermark Detection Unit

Figure 6:
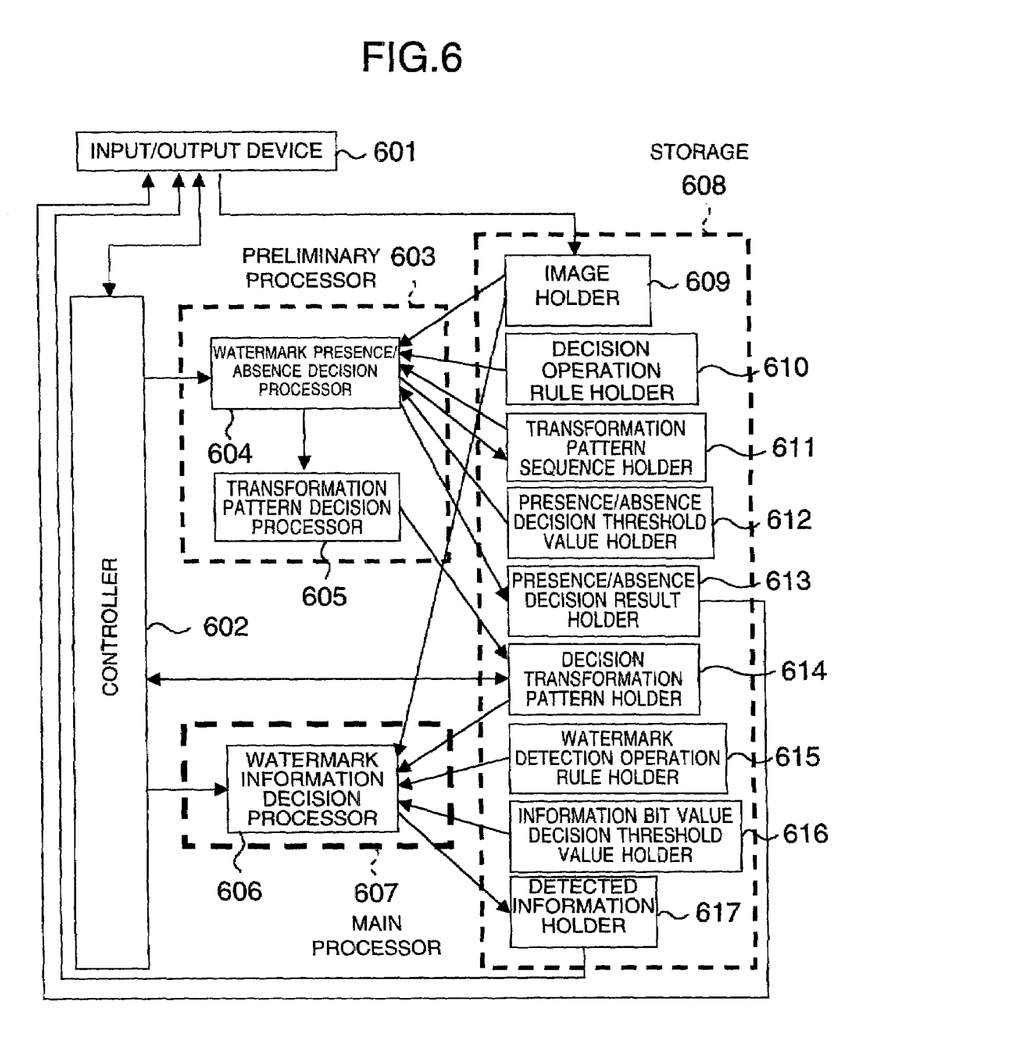
FIG. 6 is a diagram showing functional construction of a digital watermark detection apparatus in the second embodiment.

FIG. 6 is a diagram showing the functional construction of a digital watermark detection unit or watermark detector in the present embodiment.

The digital watermark detection unit includes an input/output device 601, a preliminary processor 603, a main processor 607, a storage 608 and a controller 602 for collectively controlling these components. The aforementioned individual components may be implemented with a memory table on a computer and a software program on a memory to be executed by the CPU. In this case, the memory and an external storage are used to store the above individual processors, operation rules and reference data during rule execution. It is not always necessary for the individual processors, operation rules and reference data during rule execution to be loaded on the memory and they may be implemented with hardware construction such as electronic circuits. This construction may be built in the DVD player or DVD recorder shown in FIG. 4 or another broadcasting receiver (settop box) or the like.

The storage 608 includes an image holder 609 for storing image data, a decision operation rule holder 610 for storing operation rules for the decision, a transformation pattern sequence holder 611 for storing estimative transformation patterns of image data subject to watermark presence/absence decision and the preferential sequence of the patterns, a presence/absence decision threshold value holder 612 for storing a threshold value in deciding the presence/absence of a watermark on the basis of statistical values of image data, a presence/absence decision result holder 613 for holding results of the watermark presence/absence decision, a decision transformation pattern holder 614 for holding a transformation pattern of image data when the presence of a watermark is determined, a watermark detection operation rule holder 615 for storing an operation rule for the watermark detection, an information bit value threshold value holder 616 for storing a threshold value used for decision of watermark information bit value, and a detected information holder 617 for storing a watermark information bit value. The preliminary processor 603 includes a watermark presence/absence decision processor 604 for deciding the presence/absence of a watermark in respect of image data stored in the image holder 609 in accordance with the transformation pattern sequence stored in the transformation pattern sequence holder 610, and a transformation pattern decision processor 605 for performing a process of deciding a transformation pattern applied to image data through the watermark presence/absence decision and storing the transformation pattern data in the decision transformation pattern holder 612. The main processor 607 has a watermark information decision processor 606 for performing a process of detecting a watermark information bit value from image data on the basis of the transformation pattern stored in the decision transformation pattern holder 612 and a process of storing the watermark information in the detected information holder 617.

(2) Watermark Information Detection Process

Figure 7:
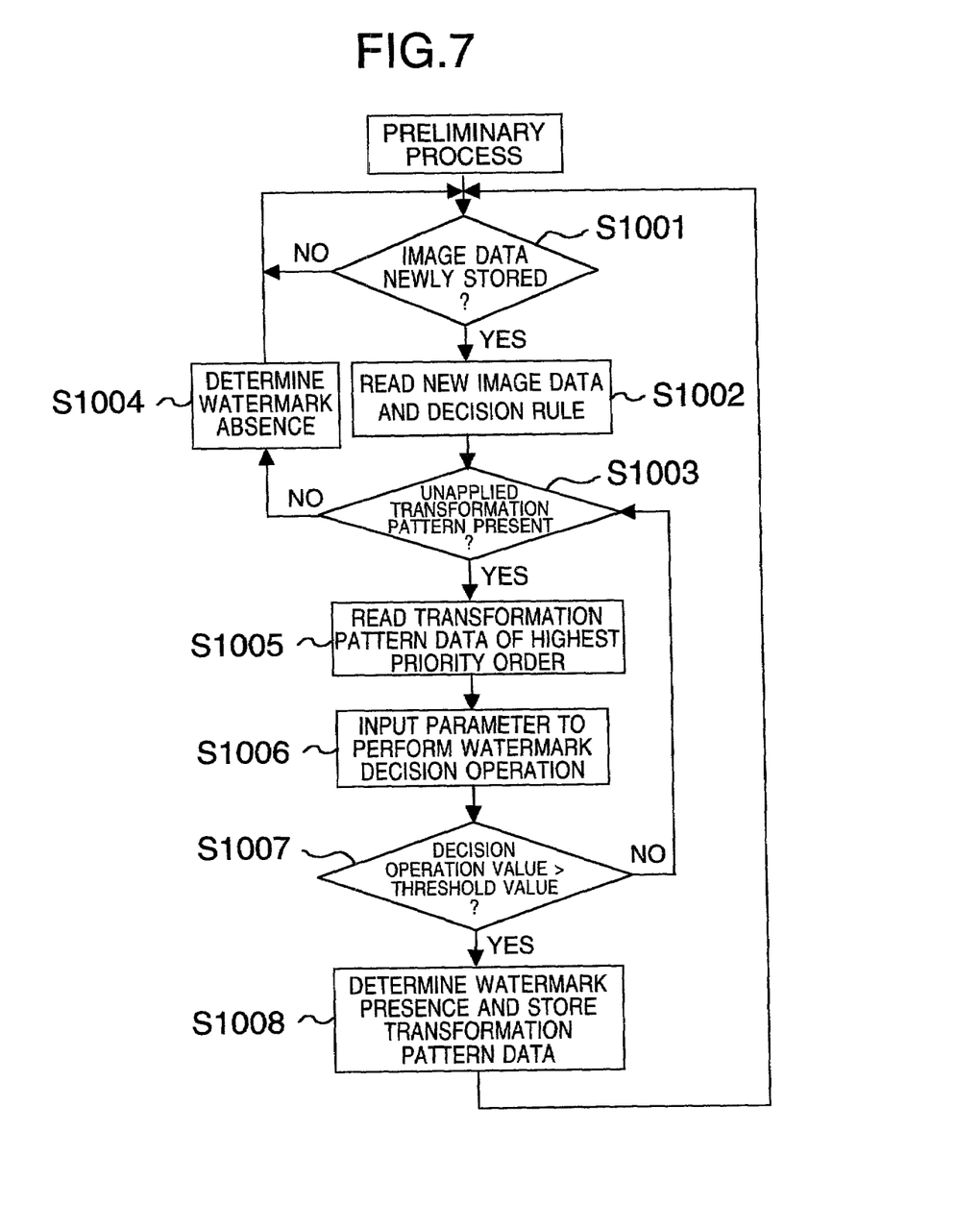
FIG. 7 is a diagram showing the flow of a preliminary process in watermark information detection in the second embodiment.

FIG. 7 shows the flow of a preliminary process for watermark information detection carried out by the preliminary processor 603 constructed as above. When image data is newly stored in the image holder 609 through the input/output device 601 (step S1001), the controller 602 commands the preliminary processor 603 to decide whether a watermark is present or absent in the newly stored image data. The watermark presence/absence decision processor 604 reads the newly stored image data from the image holder 609 and besides, reads an operation rule for watermark presence/absence decision from the decision operation rule holder 610 (step S1002). This operation rule is a formula for statistically processing values concerning pixels in the image data in order to decide whether the objective image data is applied with artificial operation, that is, a watermark. This formula can be applied to various transformation images by fetching, as parameters, the kind of a transformation pattern applied to the image and a transformation ratio. By using a result of this formula (decision operation value), the presence/absence of a watermark can be determined.

Figure 5:
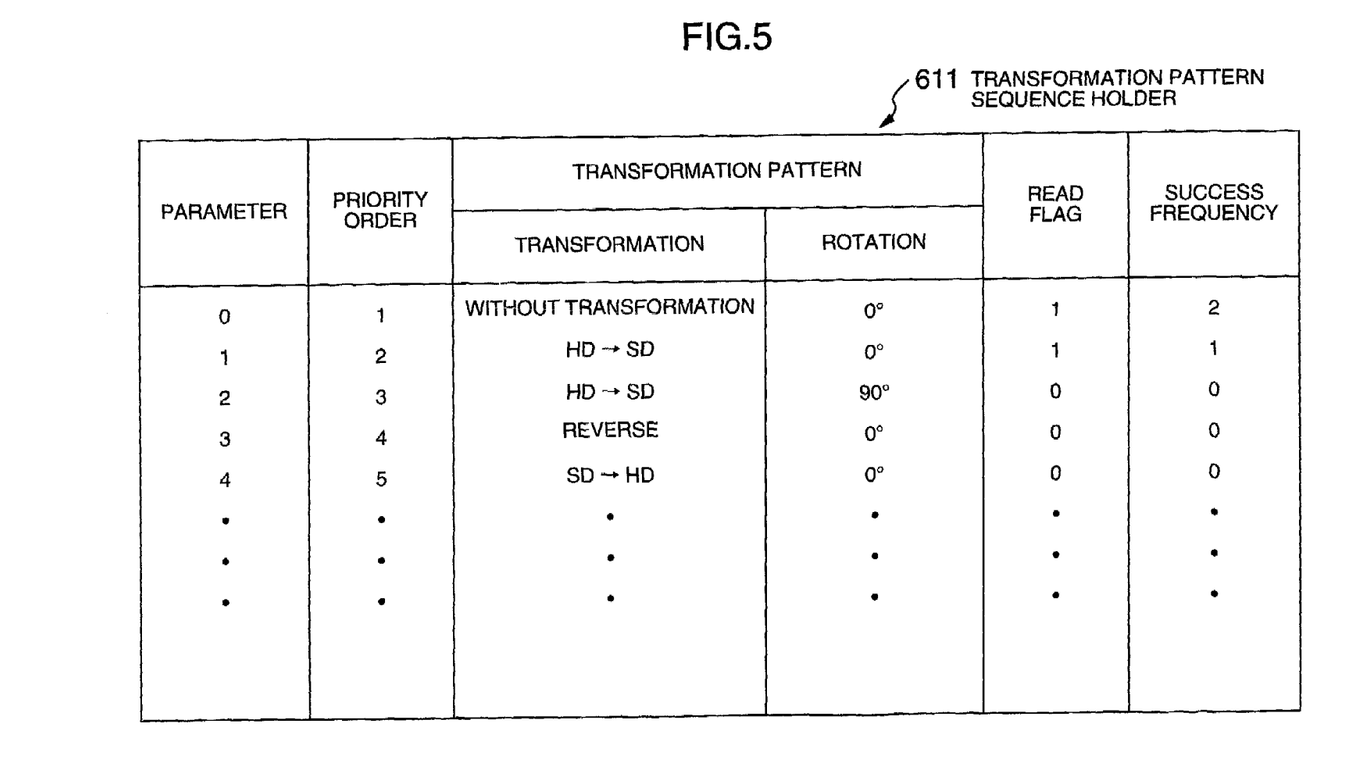
FIG. 5 is a table showing an example of a transformation pattern sequence holder in a second embodiment of the invention.

In response to a command from the controller 602, the watermark presence/absence decision processor 604 applies a specified transformation pattern from the transformation pattern sequence holder 611. The transformation pattern sequence holder 611 holds in advance a plurality of transformation patterns as shown in FIG. 5, the individual transformation patterns being assigned with priority orders. As the transformation patterns, those estimated from the transformation carried out in the general apparatus shown in FIG. 4 are prepared in advance. The watermark presence/ absence decision processor 604 decides whether transformation patterns that have not been applied yet are stored in the transformation pattern sequence holder 611 (step S1003) and then it reads parameters corresponding to a transformation pattern having the highest priority order of the unapplied transformation patterns and renders a read flag ON (step S1005).

On the assumption that the image data is applied with that transformation pattern, the watermark presence/absence decision processor 604 applies an operation for presence/absence decision to the image data. In other words, parameters corresponding to that transformation pattern are applied to the aforementioned operation rule and a decision operation for the image data is carried out (step 1006). The watermark presence/absence decision processor 604 compares a decision operation value with a presence/absence decision threshold value read out of the presence/absence decision threshold value holder 612 to decide the presence/absence of a watermark of the image data in the transformation pattern (step S1007). When the decision operation value is less than the threshold value, it is determined that watermark detection fails and the program proceeds to the step S1003 where steps S1003 to S1007 are reapplied to a different transformation pattern. When decision operation values for all transformation patterns stored in the transformation pattern sequence holder 611 are below the threshold value, the watermark presence/absence decision processor 604 determines "watermark absence" for the image data of interest and transmits the decision information to the watermark presence/absence decision result holder 613. The presence/absence decision result holder 613 stores the decision information and besides transmits the decision information to the input/output device 601 (step S1004).

On the other hand, when the decision operation value is larger than the threshold value, the watermark presence/absence decision processor 604 determines "watermark presence" for the image data and transmits decision information to the presence/absence decision result holder 613. The transformation pattern sequence holder 611 updates the number of successful operations in respect of that transformation pattern and updates the priority orders in order of the number of successful operations. The presence/absence decision result holder 113 stores the decision information and it also transmits the decision information to the input/output device 601. The watermark presence/absence decision processor 604 transmits the transformation pattern data in question to the transformation pattern decision processor 605. The transformation pattern processor 605 receiving the transformation pattern data stores it in the decision transformation pattern holder 614 (step S1008).

Figure 8:
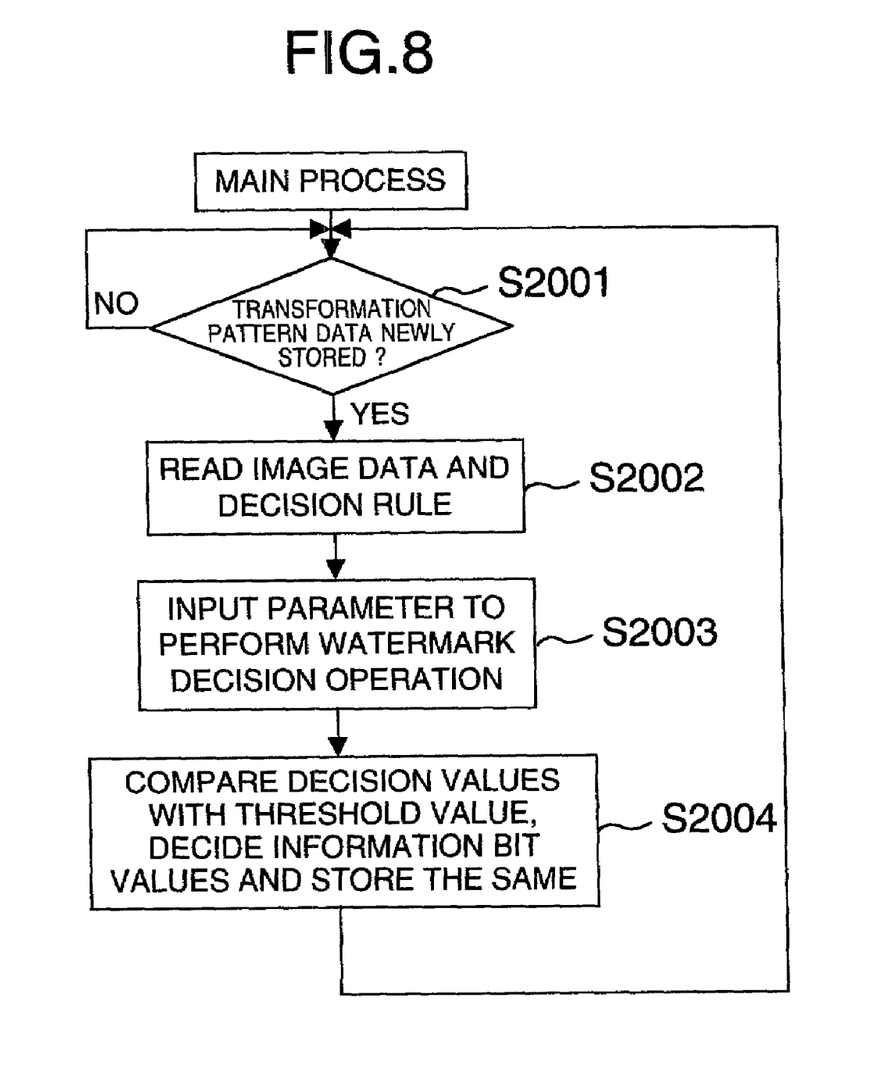
FIG. 8 is a diagram showing the flow of a main process in the watermark information detection in the second embodiment.

FIG. 8 shows the flow of the main process in the watermark information detection carried out by the main processor 607 constructed as above. In an alternative, the detection process may not always be divided into the preliminary process and the main process and may be handled in one processing unit. Image data handled in the main processor need not always be the same image data as that used in the preliminary process and they may be different from each other. It is not always necessary for the main process to be executed after the preliminary process has been applied to the image data. In a method, after the preliminary process may be applied collectively to a plurality of images, the main process may be carried out collectively.

When confirming that the transformation pattern data is newly stored in the decision transformation pattern holder 614, the controller 602 commands the main processor 607 to detect watermark information from the image data stored in the image holder 609 (step S2001). The watermark information decision processor 606 reads the image data from the image holder 609 and besides, reads an operation rule for watermark information decision from the watermark detection operation rule holder 615 (step S2002).

The watermark information decision processor 606 reads the transformation pattern data newly stored in the decision transformation pattern holder 614 and applies an operation for decision of watermark information to the image data. In other words, parameters corresponding to the transformation pattern are inputted to an operation rule for watermark information decision. The watermark information decision processor 606 specifies a partial portion of the image data constituting information bit values indicative of the watermark information and calculates decision operation values corresponding to the individual information bit values from the partial portion (step S2003). The watermark information decision processor 606 compares the decision operation values of the respective information bit values calculated in the step S2003 with a bit value decision threshold value read out of the information bit value decision threshold value holder 616 to decide each information bit value and thereafter stores the detected information in the detected information holder 617 (step S2004). The watermark information stored in the detected information holder 617 is transmitted to an external receiving terminal or controller or to another controller in the apparatus through the input/output device 601. A control operation such as recording and playback using this watermark information may be conducted.

(3) Modifications

In the preliminary process steps S1005, S1006 and S1007 in the present embodiment, a transformation pattern having the highest priority order has been described as being applied from the transformation pattern sequence holder 611 to compare a decision operation value with a threshold value but a plurality of transformation patterns having high priority orders may be applied. For example, in the steps S1006 and S1007, decision operation values in plural transformation patterns may be calculated and respective decision operation values may be compared with a threshold value. There is a possibility that plural decision operation values will exceed the threshold value but in such a case, transformation pattern data corresponding to the plural decision operation values are stored in the decision transformation pattern holder 614 in the step S1008 and a transformation pattern may be specified eventually in the main process. Alternatively, the largest decision operation value may be selected from the plural decision operation values and transformation pattern data corresponding to the largest decision operation value may be held in the decision transformation pattern holder 614.

For assumption of a transformation pattern for watermark detection, methods to be described below may be employed and incorporated in the preliminary process or the main process.

When the contents is motion picture data constructed of a plurality of sequential image data (frame data), a decision result of frame data immediately preceding data of a frame of interest (for example, if the frame of interest is N-th one, (N-1)-th frame data) may be consulted so that a transformation pattern of the same decision result as that of the immediately preceding frame may be determined as transformation pattern of the frame data in question.

When image data to be handled is motion picture data constructed of a plurality of sequential image data (frame data), that is, when sequential N frame data are defined as F1, F2, ..., Fn and watermark information detection is applied to all frame data similarly to the still image data, such a case can be dealt with by applying one of processes as below to the present embodiment.

(A) The individual frame data are decided for a transformation pattern independently of each other to detect an information bit. (B) Initial frame F1 of each frame data is decided for a transformation pattern to detect an information bit. The determined transformation pattern is saved. For the following frame data F2, ..., Fn, a transformation pattern is not decided and the transformation pattern determined and saved in respect of the initial frame is used to detect an information bit in the following frame data. (C) For frame F1 of each frame data, a transformation pattern is decided to detect an information bit. For the ensuing frame data F2, ..., Fn, a decision operation value C is first calculated in respect of the transformation pattern determined in the immediately preceding frame and the calculated value is compared with a threshold value T. If a result shows that C>T, "watermark presence" is determined in the transformation pattern and that transformation pattern is stored in the decision transformation pattern holder 614. On the other hand, if C≦T, decision operation values are again calculated with new different transformation patterns and an information bit is detected using a transformation pattern exceeding the threshold value.

In the transformation pattern decision in the above process, a decision process may newly be carried out with specified frame data such as F10, F20, F30 ... to permit accurate transformation pattern decision. When the decision operation values are again calculated with different transformation patterns in the above process (C), the priority order conforming to the transformation pattern determined in the initial frame may be used as the priority order of the transformation pattern consulted in the calculation.

In the second embodiment, too, an input image may first be converted into a specified format and thereafter the preliminary process may be started.

The foregoing embodiments have been described by taking the image data as the objective contents, for instance, but this is not limitative. For example, specified transformation of musical data (such as playback speed change and modulation) may preferentially be dealt with to decide the presence/absence of a watermark or detect watermark information.

3. Method of Embedding Information Immune to Transformation

In the first embodiment, the method has been described, according to which the image data is converted into a specified format and thereafter a watermark is detected. On the image data distributing side, it is preferable that the watermark be embedded by predicting the conversion into the specified format in advance.

Figure 10:
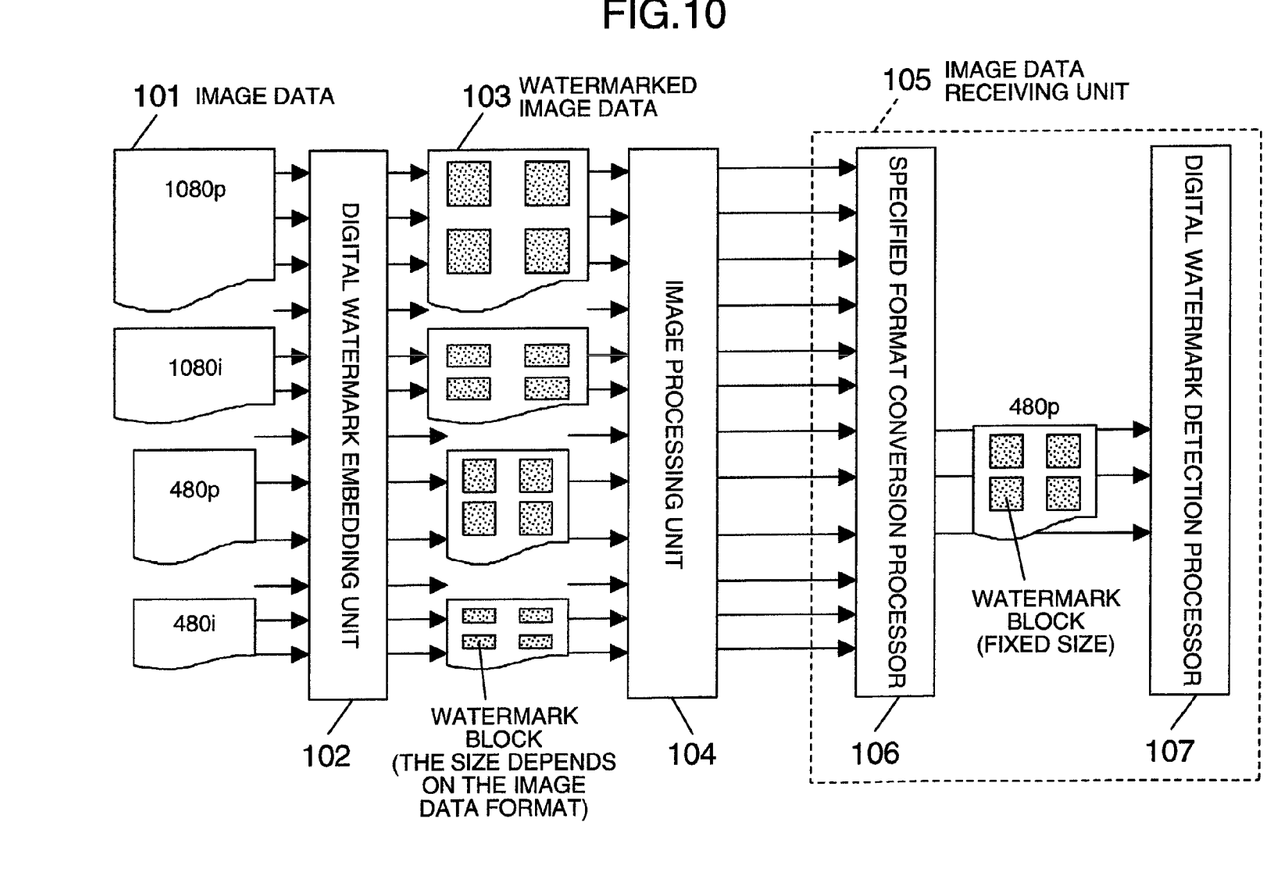
FIG. 10 is a diagram for explaining an example of a watermark embedding method immune to transformation.

A case in which the watermark is embedded at some predetermined areas (watermark blocks) in the image and the image is converted to 480 p format on the image receiving side will be considered as shown in FIG. 10. When embedding the watermark on the image data distributing side, each watermark block size is determined so that the watermark block will be a fixed size after the format conversion on the image receiving side.

Figure 9:
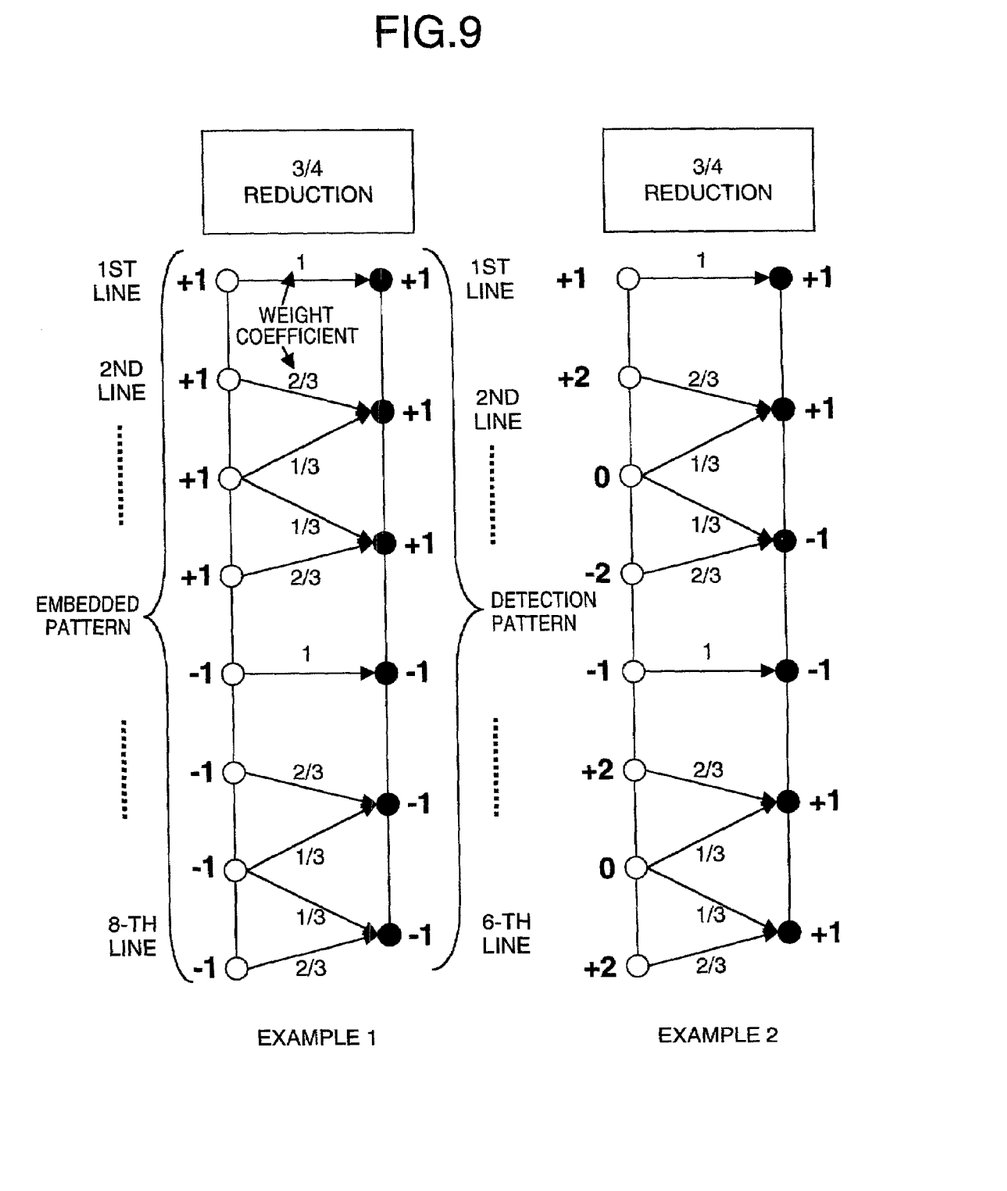
FIG. 9 is a diagram for explaining an example of a watermark embedding method immune to transformation.

A case in which the image data is ¾ reduced on the image receiving side will be considered. FIG. 9 is a diagrammatic representation showing a conversion method for reducing a frame image constructed of 8 lines to that of 6 lines. In the drawing, a blank circle indicates each line of watermarked image data 103 and a blackened circle indicates each line of an image after a specified format conversion process. A numeral on an arrow from blank circle to blackened circle indicates a weight coefficient during conversion operation and a numeral attached to the blank and blackened circles indicates a watermark pattern superposed on a pixel value (for example, +1 means one gradation addition to a pixel value). When a detection pattern detectable by the digital watermark detection processor changes in sign every 3 lines as shown at example 1 in FIG. 9, an embed pattern to be superposed on original image data 101 becomes a pattern that changes in sign every 4 lines. Further, when the detection pattern changes in sign every 2 lines, an embed pattern becomes a pattern including two gradation change as shown at example 2 in FIG. 9.

In the above examples, each line need not always be the pixel value and even for a DCT coefficient after JPEG or MPEG compression, a method for embedding information immune to transformation can be computed similarly.

It will be further understood by those skilled in the art that the foregoing description has been made on embodiments of the invention and that various changes and modifications may be made in the invention without departing from the spirit and scope of the appended claims.

What is claimed is:

1. A digital watermark information detection method for detecting information inserted as a digital watermark from contents, comprising:
   a first step of selecting a predetermined format conversion method in accordance with format information of said contents;
   a second step of converting said contents in accordance with said selected format conversion method;
   a third step of trying to detect said inserted information from said converted contents,
   wherein a plurality of said format conversion methods are selected in said first step and said second step is performed using one of selected format conversion methods; and
   a fourth step of trying to detect said inserted information using another format conversion method other than said conversion method used in said second step if said inserted information is not detected from said contents converted in said third step.

2. A digital watermark information detection method for detecting information inserted as a digital watermark from contents, comprising:
   a first step of selecting a predetermined format conversion method in accordance with format information of said contents;
   a second step of converting said contents in accordance with said selected format conversion method; and
   a third step of trying to detect said inserted information from said converted contents,
   wherein a plurality of said format conversion methods are selected in said first step and said format conversion methods are assigned with priorities in advance, and
   a fourth step of repeating said second steps and said third step using one of said format conversion methods in order of assigned priorities.

3. A digital watermark information detection method according to claim 2, further comprising:
   a fifth step of recording the number of successful information detections for each of said format conversion methods performed in said third step; and a sixth step of updating the assigned priorities of said format conversion methods in accordance with the number of successful information detections.

4. A digital watermark information detection method for detecting information inserted as a digital watermark from contents, comprising:

a first step of selecting a predetermined format conversion method in accordance with format information of said contents;

a second step of converting said contents in accordance with said selected format conversion method; and a third step of trying to detect said inserted information from said converted contents, wherein said first step includes:

a first substep of obtaining format information of said contents from said contents, and a second substep of selecting said predetermined format conversion method corresponding to the obtained format information.

* * * * *